US010025937B1

(12) United States Patent
Kashyap et al.

(10) Patent No.: US 10,025,937 B1
(45) Date of Patent: Jul. 17, 2018

(54) PRACTICAL AND DYNAMIC APPROACH TO ENTERPRISE HARDENING

(71) Applicant: Symantec Corporation, Mountain View, CA (US)

(72) Inventors: Anand Kashyap, Los Altos, CA (US); Kevin A. Roundy, El Segundo, CA (US); Sandeep Bhatkar, Sunnyvale, CA (US); Aleatha Parker-Wood, Palo Alto, CA (US); Christopher Gates, Culver City, CA (US); Yin Liu, Sunnyvale, CA (US); Leylya Yumer, Antibes (FR)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/752,619

(22) Filed: Jun. 26, 2015

(51) Int. Cl.
| | |
|---|---|
| *G06F 21/60* | (2013.01) |
| *G06Q 10/10* | (2012.01) |
| *G06Q 20/20* | (2012.01) |
| *G06F 21/62* | (2013.01) |

(52) U.S. Cl.
CPC ........... *G06F 21/604* (2013.01); *G06F 21/62* (2013.01); *G06Q 10/10* (2013.01); *G06Q 20/206* (2013.01)

(58) Field of Classification Search
CPC . H04L 63/0428; H04L 63/1433; H04L 43/08; H04L 63/0263; G06F 21/6218
USPC ............................................. 726/27; 380/210
See application file for complete search history.

(56) References Cited

U.S. PATENT DOCUMENTS

| | | | | |
|---|---|---|---|---|
| 2005/0097339 A1* | 5/2005 | Wiley | ................... | G06F 21/554 713/188 |
| 2006/0253724 A1* | 11/2006 | Zhang | ................ | G06F 11/1451 714/2 |
| 2010/0050244 A1* | 2/2010 | Tarkhanyan | ............ | G06F 21/57 726/7 |
| 2010/0077445 A1* | 3/2010 | Schneider | ............... | G06F 21/52 726/1 |
| 2011/0047620 A1* | 2/2011 | Mahaffey | .............. | G06F 21/564 726/23 |
| 2013/0097660 A1* | 4/2013 | Das | ......................... | H04L 63/10 726/1 |
| 2015/0067845 A1* | 3/2015 | Chari | ...................... | G06F 21/50 726/23 |
| 2015/0304736 A1* | 10/2015 | Lal | ......................... | G06F 21/10 380/210 |

(Continued)

OTHER PUBLICATIONS

Dhar, "Securing and Hardening Red Hat Linux", 2006, Computer Operations Security, pp. 21-30.*

(Continued)

*Primary Examiner* — Taghi Arani
*Assistant Examiner* — Gregory Lane
(74) *Attorney, Agent, or Firm* — Patterson + Sheridan, LLP

(57) ABSTRACT

Techniques are disclosed for dynamically managing hardening policies in a client computer (e.g., of an enterprise network). A hardening management application monitors activity on the client computer that is associated with a first hardening policy. The monitored activity is evaluated based on one or more metrics. Upon determining that at least one of the metrics is outside of a tolerance specified in the first hardening policy, the client computer is associated with a second hardening policy. The client computer is reconfigured based on the second hardening policy.

17 Claims, 7 Drawing Sheets

(56) References Cited

U.S. PATENT DOCUMENTS

2016/0092683 A1* 3/2016 Mityagin .............. G06F 21/561
                                                                        726/24

OTHER PUBLICATIONS

Global Information Assurance Certification Paper, Level 1 Security EssentialsPaper Hardening in the Enterprise: Always an After Thought?, SANS Institute 2000-2002, 9 pages.

Hardening Red Hat Enterprise Linux 5, Red Hat Summit, Jun. 18-20, 2008, updated Aug. 12, 2010, 42 pages.

Automatic Server Hardening, Telekom Innovation Laboratories, 2017, http://www.laboratories.telekom.com/public/english/innovation/exponate/pages/automatic-server-hardening.aspx, 1 page.

Securing Debian Manual, Securing Debian Manual Chapter 6—Automatic hardening of Debian Systems, https://www.debian.org/doc/manuals/securing-debian-howto/ch-automatic-harden.en.html, 3 pages.

Tripwire, Tripwire Enterprise Policy Manager: Supported Policies, https://www.tripwire.com/products/tripwire-enterprise/tripwire-enterprise-policy-manager-harden-your-systems-registed/, 2 pages.

* cited by examiner

PRACTICAL AND DYNAMIC APPROACH TO ENTERPRISE HARDENING

BACKGROUND

Field

Embodiments presented herein generally relate to securing computer systems, and more specifically, to dynamically hardening enterprise computer systems based on observed metrics.

Description of the Related Art

Hardening is the process of securing a computer system by reducing a surface of vulnerability. For example, an administrator configures the computer system such that the system is restricted to execute specified applications ("whitelisted" applications) and access specified system resources. One example of a hardened computing system is a point-of-sales (POS) terminal. Typically, a POS terminal has limited application permissions. For instance, the POS terminal may be permitted to only execute applications used to process payments. Another example of a hardened computing system is a mail server. Whitelisted applications on a mail server are typically limited to a mail daemon and other mail-related processes. As another example, an administrator may harden work computers in an enterprise network such that a user can execute a limited library of applications, such as productivity applications, enterprise messaging clients, and the like.

However, although hardening provides security to a given system, hardening policies are often rigid. Thus, overall usability is often degraded by the hardening process. For example, a developer may want to execute test code but be prohibited from installing non-whitelisted executables on a hardened enterprise system. To be able to do so, the developer might need to contact an enterprise administrator to configure the appropriate permissions on a hardened development system. Further, the administrator is typically tasked with managing whitelisted applications and network resources. That is, the administrator must manually enter application (or network resource) information into a given whitelist for a particular user or user group. As hardening can be a frustrating and tedious process for both users and administrators, enterprises sometimes decline to adopt such an approach, which may in turn leave enterprise systems vulnerable to attacks.

SUMMARY

One embodiment presented herein describes a method. The method generally includes monitoring activity on a client computer. The client computer is associated with a first hardening policy. The method also includes evaluating the monitored activity based on one or more metrics. Each of the metrics are within a tolerance specified in the first hardening policy. Upon determining that at least one of the metrics is outside of the tolerance specified in the first hardening policy, the client computer is associated with a second hardening policy. The client computer is reconfigured based on the second hardening policy.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
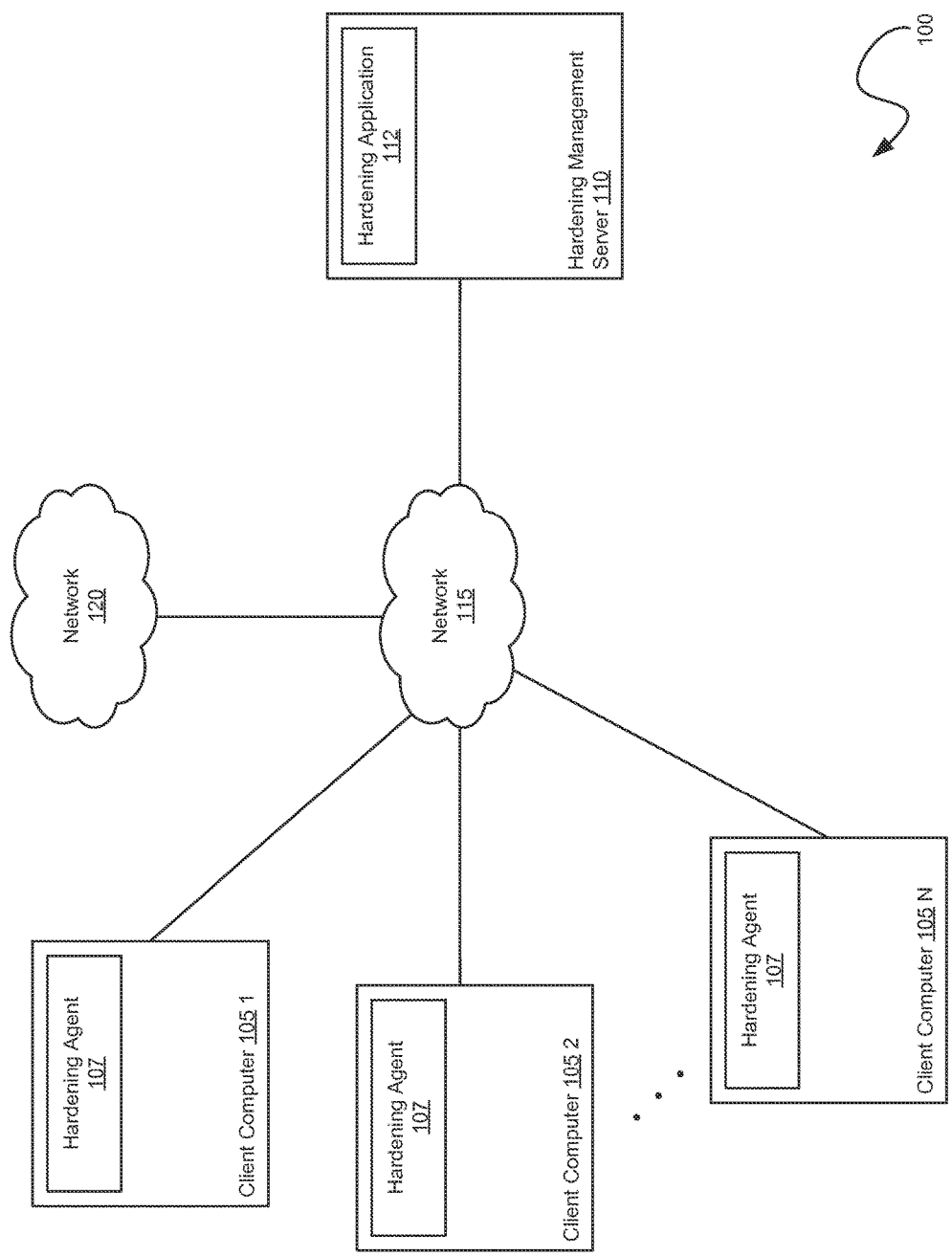
FIG. 1 illustrates an example computing environment, according to one embodiment.

Embodiments presented herein describe techniques for dynamically hardening a computing system. In one embodiment, a hardening management server maintains policies applied to hosts in a computing network, e.g., an enterprise computing network. The hardening management server can apply a given hardening policy to an individual computing system based on profiles associated with a user of the system, network resources of the system, applications and files stored on the system, and the system itself.

Further, the user profiles may include metrics used to determine what hardening policy to enforce. Such metrics may be based on risk and stability. For instance, a profile may indicate a level of security risk of a corresponding user. The hardening management server may determine the risk level based on several factors, such as a specified technical skill of the user, access privileges granted to the user, whether an account associated with the user has been attacked in the past, and so on. As another example, a profile may indicate a level of stability of a given computing system, network resources, a measure of exposure of the system, etc. The hardening management server can measure stability of a system based on several factors, such rate of application installations on the system, network bandwidth, open ports, and so on.

As stated, the hardening management server may apply a hardening policy to a given computing system based on a profile. For example, if the profile indicates that a user of the system is a high-risk user, the hardening management server may apply a hardening policy that restricts the user to whitelisted applications and resources of the system. The hardening policy may specify that the user is not permitted to download any applications unless an administrator explicitly grants the user permission to do so.

As a contrasting example, assume the profile indicates that a user is a low-risk user and that the system is relatively stable. The hardening management server may still apply a hardening policy that restricts the user to whitelisted applications and resources of the system. However, the hardening policy applied to the low-risk user may specify exemptions that allow the user to install and execute non-whitelisted applications. For instance, based on the policy, the user can install a given application, but doing so may increase the risk level of the user. As another example, the user can install a non-whitelisted application, subject to limited privileges (e.g., certain ports are blocked from access by the application, writes to certain folders or file systems are blocked, etc.).

In one embodiment, the hardening management server may dynamically configure a hardening policy assigned to a computing system. To do so, the hardening management server monitors activity of the computing system, e.g., via activity data transmitted by an agent installed on the computing system. The hardening management server may evaluate the activity data relative to the profile metrics. Further, based on the evaluation, the hardening management server may adjust the metrics. For example, if a user installs an application known to have a number of security vulnerabilities, the hardening management server may adjust a risk-level associated with the system.

In the event that a metric exceeds a given threshold, the hardening management server may adjust the hardening policy assigned to the computing system, e.g., by applying a hardening policy that restricts the user to execute only whitelisted applications and network resources. Similarly, in the event that a metric falls below a given threshold, the hardening management server may adjust the hardening policy assigned to the computing system, e.g., by applying a hardening policy that allows the user to install applications on the system and use various network resources restricted by other hardening policies.

Advantageously, embodiments presented herein provide an approach which allows a low-risk user on a relatively stable computing system to use the computing system with fewer hardening restrictions. Likewise, if any metrics later exceed a threshold, the hardening management system can further restrict activity on the computing system. As a result, the burden of manually managing the on an administrator is decreased.

FIG. 1 illustrates an example computing environment 100, according to one embodiment. As shown, computing environment 100 includes a number of client computers 105, a hardening management server 110, a network 115, and a network 120. In one embodiment, computing environment 100 is representative of an enterprise computing network. The client computers 105 may represent a physical computing system (e.g., a desktop computer, laptop computer, tablet computer, etc.). Further, the client computers 105 may also represent a virtual machine instance executing in a cloud network. The network 115 interconnects the client computers 105 and the hardening management server 110. Further, the network 115 may connect to the network 120 (e.g., the Internet).

In one embodiment, the hardening management server 110 includes a hardening application 112. The hardening application 112 manages hardening policies for each of the client computers 105. A hardening policy specifies usage restrictions on a given client computer 105 that a hardening agent 107 executing on the client computer 105 enforces. For example, a given hardening policy may limit usage of a client computer 105 to only whitelisted applications. In addition, the hardening policy may place certain restrictions on network resources (e.g., ports, network protocols, access to certain servers, etc.), based on the policy. The hardening agent 107 may receive policy information from the hardening application 112 and enforce the policy to the client computer 105.

In one embodiment, the hardening application 112 monitors activity data transmitted via the network 115 by each hardening agent 107. Such activity data for a given client computer 105 may include user activity, network usage, open network resources, application activity, system activity, and the like. Further, the hardening application 112 evaluates the activity data against specified rules and conditions.

Based on the evaluation, the hardening application 112 may calculate or update hardening metrics. In one embodiment, the hardening application 112 may adjust a hardening policy assigned to a client computer 105 in response to a change in the hardening metrics. Examples of hardening metrics may include a risk metric and a stability metric. A risk metric measures a likelihood that a given client computer 105, application, network resource, or user is susceptible to attack. The risk metric may be a weighted combination of risk scores calculated for each of the client computer 105, application, network resource, or user. A stability metric measures, e.g., a rate at which applications and new files are installed or stored on the system. The stability metric indicates that a system is stable if the rate is low.

In cases where a certain metric exceeds one threshold, the hardening application 112 may increase a level of hardening on the client computer 105. A higher level of hardening may be more restrictive, e.g., limiting the user strictly to whitelisted applications, system, and networking resources. If the metrics fall below another threshold, the hardening application 112 may decrease a level of hardening on the client computer 105. Decreased hardening may be less restrictive, e.g., allowing non-whitelisted applications installed prior to the hardening adjustment to be executed with minimal restrictions. Further, a decreased hardening may provide exemptions that allow a user to install applications or access resources with minimal involvement with an administrator. For example, a user may be permitted to install the application, subject to additional monitoring in the hardening application 112. Another example includes allowing the user to apply crowdsourcing techniques to obtain permission to whitelist a desired application. That is, the enterprise network may be configured with a crowdsourcing service that allows a number of enterprise users to determine (e.g., by voting methods) whether a user should be able to whitelist the application. In yet another example, a user may be permitted to install the application subject to two-factor authentication of the user, e.g., to prevent malicious actors from installing malware on a compromised account of the user. Further, in some cases, the hardening application 112 may increase the risk level of the user, application, and client computer 105 in the event that the user installs the desired application.

After adjusting a hardening policy to associate with a client computer 105, the hardening application 112 sends the change in policy to the corresponding hardening agent 107. In turn, the hardening agent 107 may reconfigure the client computer 105, user accounts, and applications based on the change in policy.

Figure 2:
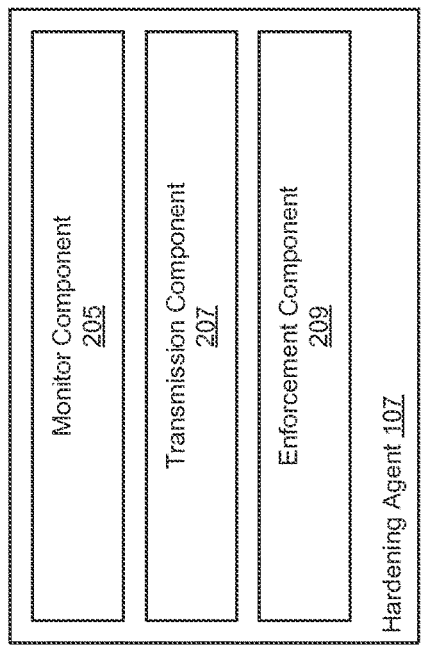
FIG. 2 further illustrates the hardening agent described relative to FIG. 1, according to one embodiment.

FIG. 2 further illustrates the hardening agent 107, according to one embodiment. As shown, the hardening agent 107 includes a monitor component 205, a transmission component 207, and an enforcement component 209.

In one embodiment, the monitor component 205 observes activity occurring in the client computer 105. For example, the monitor component 205 can activity of a user interaction with applications, activity of a given application, network resource activity, and overall system activity. An example of user activity is access to web sites, downloads to a file system, uploads from a file system, application installations, and the like. Application activity may include transmission of data by the application to a given destination, registry access, file system access, and the like. Network resource activity may include network traffic flow, open ports, and the like. System activity may include I/O operations, access to various components of the client computer 105, and the like. The monitor may package such activity as data or a log to send to the hardening management server 110.

In one embodiment, the transmission component 207 sends and receives data to and from the hardening management server 110. For instance, the transmission component 207 sends the packaged activity data to the hardening management server 110. In response, the hardening application 112 of the hardening management server 110 may evaluate the activity data and return an indication of an adjustment to a hardening policy assigned to the client computer 105. The transmission component 207 may receive the indication and send the indication to the enforcement component 209.

In one embodiment, the enforcement component 209 applies one or more hardening policies to a client computer 105 on behalf of the hardening management server 100. Further, the enforcement component 209 may receive indications from the hardening management server 100 to adjust a hardening policy. In response, the enforcement component 209 may re-configure user accounts, applications, and network resources associated with the client computer 105 (as well as the client computer 105 itself) based on indicated changes. For example, if the indication specifies to increase a hardening level, the enforcement component 209 may configure user permissions such that the user is unable to access non-whitelisted applications. In addition, the enforcement component 209 may restrict network traffic to flow out of specified ports only. As another example, if the indication specifies to decrease the hardening level, the enforcement component 209 may reconfigure the client computer 105 such that the user may install applications to the client computer 105, subject to certain conditions.

Figure 3:
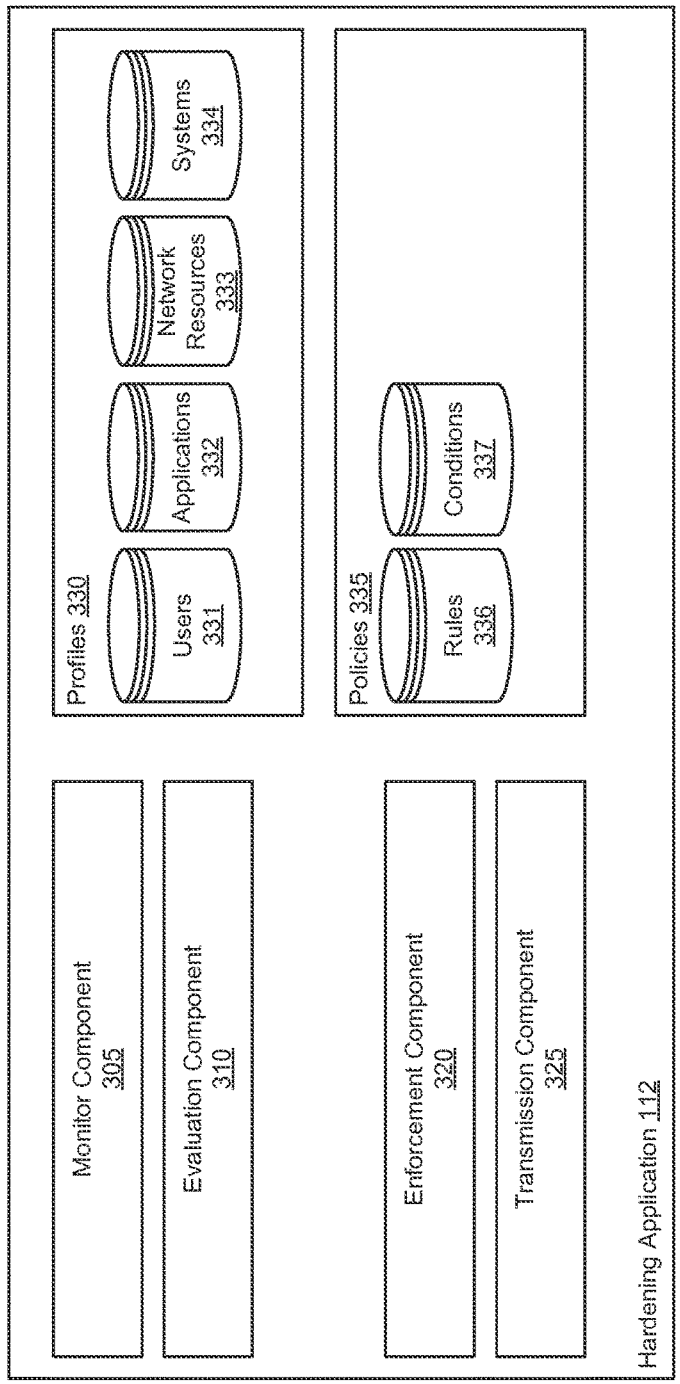
FIG. 3 further illustrates the hardening application described relative to FIG. 1, according to one embodiment.

FIG. 3 further illustrates the hardening application 112, according to one embodiment. As shown, the hardening application 112 includes a monitor component 305, an evaluation component 310, an enforcement component 320, a transmission component 325, profiles 330, and policies 335.

In one embodiment, the monitor component 305 receives observed activity data from each of the client computers 105 in the enterprise network. The activity data may correspond to user activity, application activity, network activity, and system activity. Each of the activity data may be associated with a respective profile 330. As shown, the profiles 330 may include various types, such as users 331, applications 332, and network resources 333.

Further, each of the profiles 330 may be associated with various metrics, such as a risk metric. For instance, a risk metric of a user may indicate a likelihood that the particular user is susceptible to an attack. The metric may be measured based on technical skill of the user, past attacks (or attempts) on the user, how much access the user has to sensitive data, and the like. As another example, a risk metric of a given application may indicate a likelihood that the application is susceptible to an attack. Such a risk metric may be calculated based on global reputation of the application (e.g., whether the application has been attacked in the past) or based on observed data. Further, the risk metric may be measured based on a context of the enterprise network. For instance, a system management application may have a lower risk score if executing on a developer system of the enterprise. However, the system management application may have a higher risk score if executing on a financial marketing system in the enterprise.

Another such metric is a stability metric. A stability metric associated with a system may measure a rate that new or unknown applications are installed on the system. A high stability metric may indicate that a system is relatively stable. Typically, hardening a relatively stable system presents little difficulty, because locking down the system affects only new installations to a given system after hardening.

Further, the activity data may be associated with policies 335. As shown, the policies 335 include rules 336 and conditions 337 applied to a given client computer 105. The policies 335 may vary across the client computers 105 through the enterprise network. For instance, a client computer 105 having high-risk levels for a user and suite of applications may be subject to a rigid policy 335. Rules 336 of such a policy 330 may specify that only whitelisted applications and resources may be used on that client computer 105 by a given user. Another rule 336 may specify that the user may only install a non-whitelisted application with explicit permission from an administrator.

The evaluation component 310 analyzes the observed data from a given client computer 105 against the associated profiles 330 and policies 335. Particularly, the evaluation component 310 analyzes the observed data relative the metrics, e.g., the risk and stability metrics. For example, the evaluation component 310 can determine whether certain observed activity would increase a risk metric, based on a rule 336. For instance, the activity data may indicate that the user frequently downloads files from sites with known vulnerabilities. In turn, the evaluation component 310 may score a level of risk accordingly. As another example, the evaluation component 310 can determine certain observed activity would describe a stability metric, based on a rule 336. For instance, the activity data may indicate that the user is downloading a number of unknown applications at a high rate. The evaluation component 310 may score a level of stability accordingly.

In one embodiment, the evaluation component 310 determines whether to adjust a hardening policy assigned to the client computer 105 based on changes one or more of the metrics (e.g., the risk metric, stability metric, etc.). The conditions 337 may specify metric thresholds used to determine whether to adjust the policy. For instance, if the risk metric exceeds a given threshold (i.e., the risk level of a user, application, network resource, or system has increased), the evaluation component 310 may increase a level of the assigned hardening policy 330, such that the policy 330 is more restrictive. Similarly, if the stability metric falls below a given threshold (i.e., a rate of new application installations has risen), the evaluation component 310 may increase the level of the policy 330. The enforcement component 320 applies the changes to the policy 330 based on the result from the evaluation component 310. The transmission component 325 sends an indication of the change in the hardening policy 330 to the hardening agent 107 of the associated client computer 105.

Figure 4:
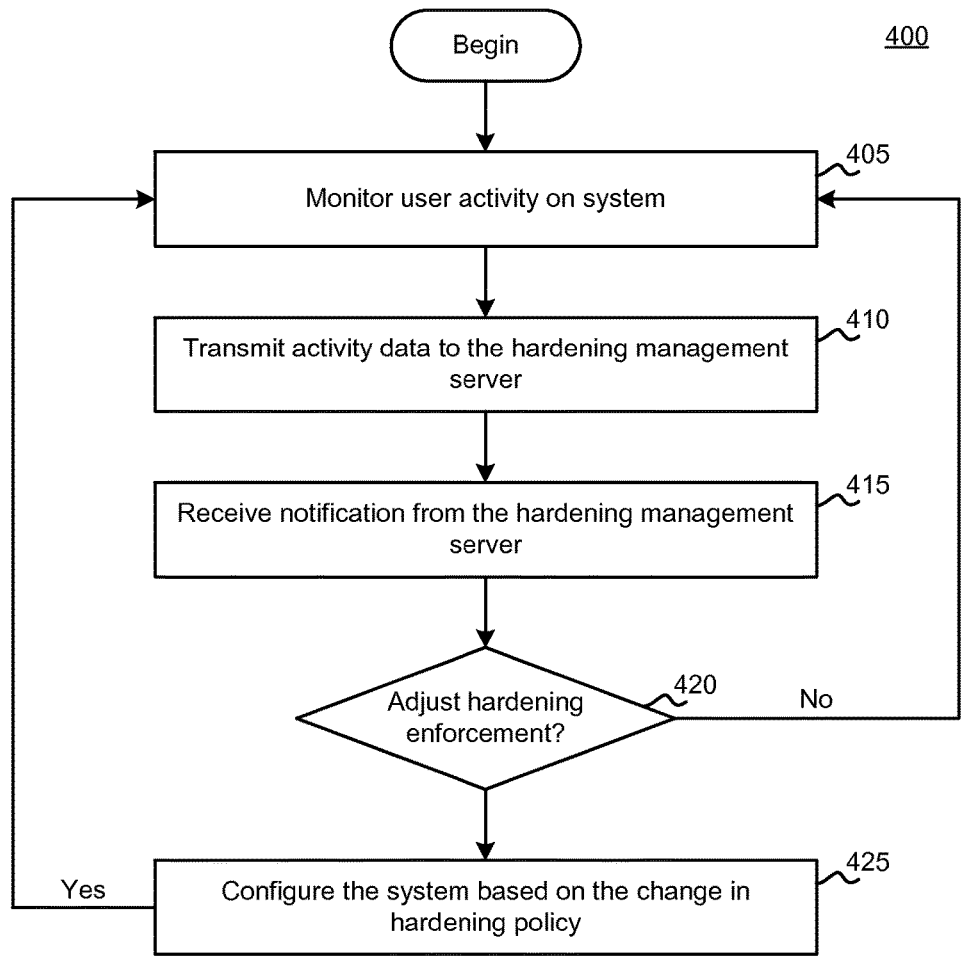
FIG. 4 illustrates a method for adjusting an enforced hardening policy on a computing system, according to one embodiment.

FIG. 4 illustrates a method 400 for adjusting a hardening policy on a client computer 105, according to one embodiment. In particular, method 400 may be performed by the hardening agent 107. As shown, the method 400 begins at step 405, where the monitor component 205 observes activity on the system. As stated, monitored activity may include user activity, application activity, network resource activity, and other activity of the client computer 105.

At step 410, the transmission component 207 sends the observed activity data to the hardening management server 110. In turn, the hardening application 112 analyzes the observed activity data. The hardening application 112 does so to determine whether to adjust a hardening policy currently assigned to the client computer 105.

At step 415, the transmission component 207 receives an indication from the hardening application 112 specifying whether to adjust a hardening policy assigned to the client computer 105, and the hardening component 107 evaluates the indication (at step 420) to determine whether to adjust the assigned hardening policy. If so, then at step 425, the enforcement component 209 reconfigures the client computer 105 according to the change in the policy. For example, if the hardening application 112 indicates to increase a level of hardening, then the hardening agent 107 restricts access to non-whitelisted applications installed on the client computer 105. The hardening agent 107 may also block a user from accessing non-whitelisted sites.

Figure 5:
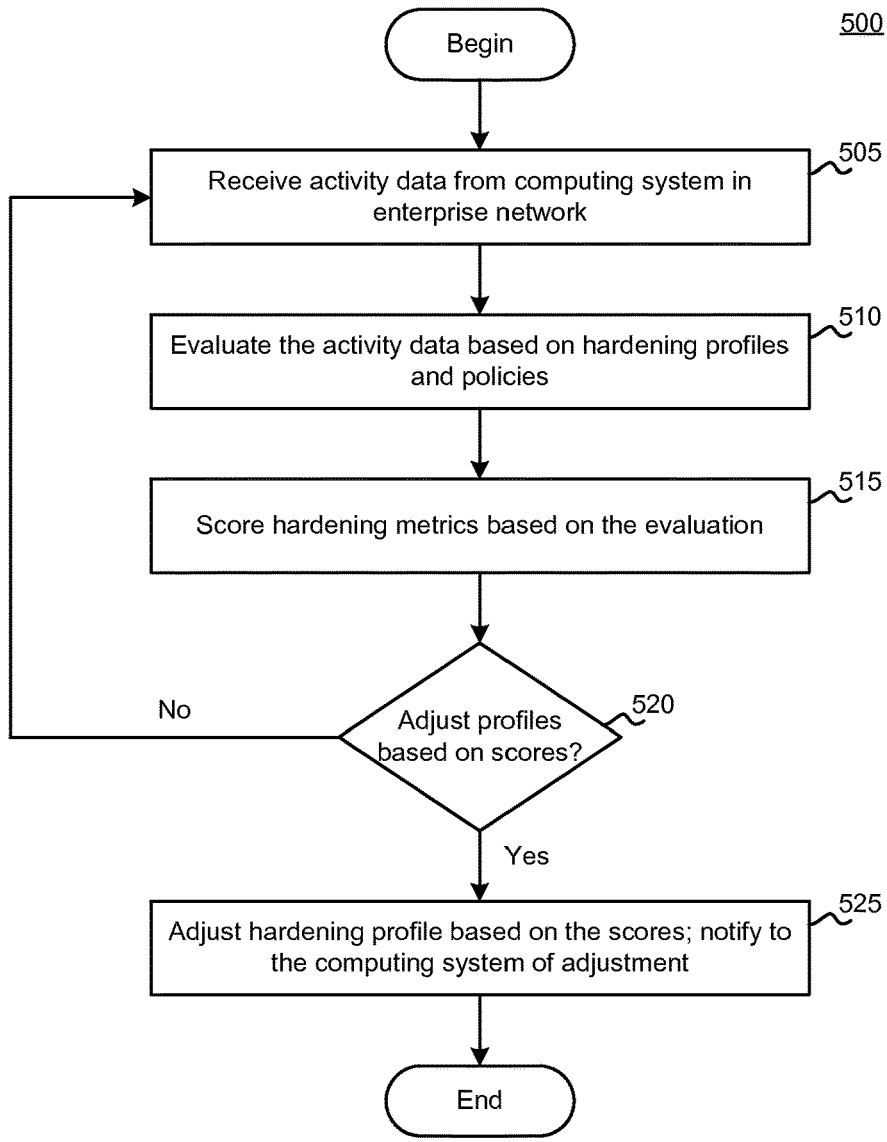
FIG. 5 illustrates a method for dynamically adjusting a computing system based on a observed metrics, according to one embodiment.

FIG. 5 illustrates a method 500 for dynamically adjusting a computing system based on observed metrics, according to one embodiment. In one embodiment, method 500 is performed by the hardening application 112. As shown, method 500 begins at step 505, where the monitor component 305 receives activity data (e.g., user activity, network resource activity, application activity, etc.) from a hardening agent 107 of a client computer 105.

At step 510, the evaluation component 310 analyzes the activity data based on profiles and a policy associated with client computer 105, such as profiles associated with the user logged into the client computer 105, applications executing on the client computer 105, network resources and traffic flowing from the client computer 105, and the like. In addition, the evaluation component 310 may evaluate the activity data based on a context associated with the client computer 105 (e.g., whether the client computer 105 is a part of a legal department, an IT department, etc.). At step 515, the evaluation component 310 may score various metrics, such as risk and stability metrics, based on the analysis. Further, the evaluation component 310 may compare the metrics to respective thresholds to determine whether to adjust an assigned hardening policy (at step 520).

If the evaluation component 310 determines to adjust an assigned hardening policy, then at step 525, the enforcement component 320 changes the hardening policy based on the scored metrics. For example, if the risk metric falls below a minimum specified threshold, the enforcement component 320 may decrease a current level of hardening on the client computer 105. The transmission component 325 may notify the associated hardening agent 107 to enforce the adjusted policy on the client computer 105.

Figure 6:
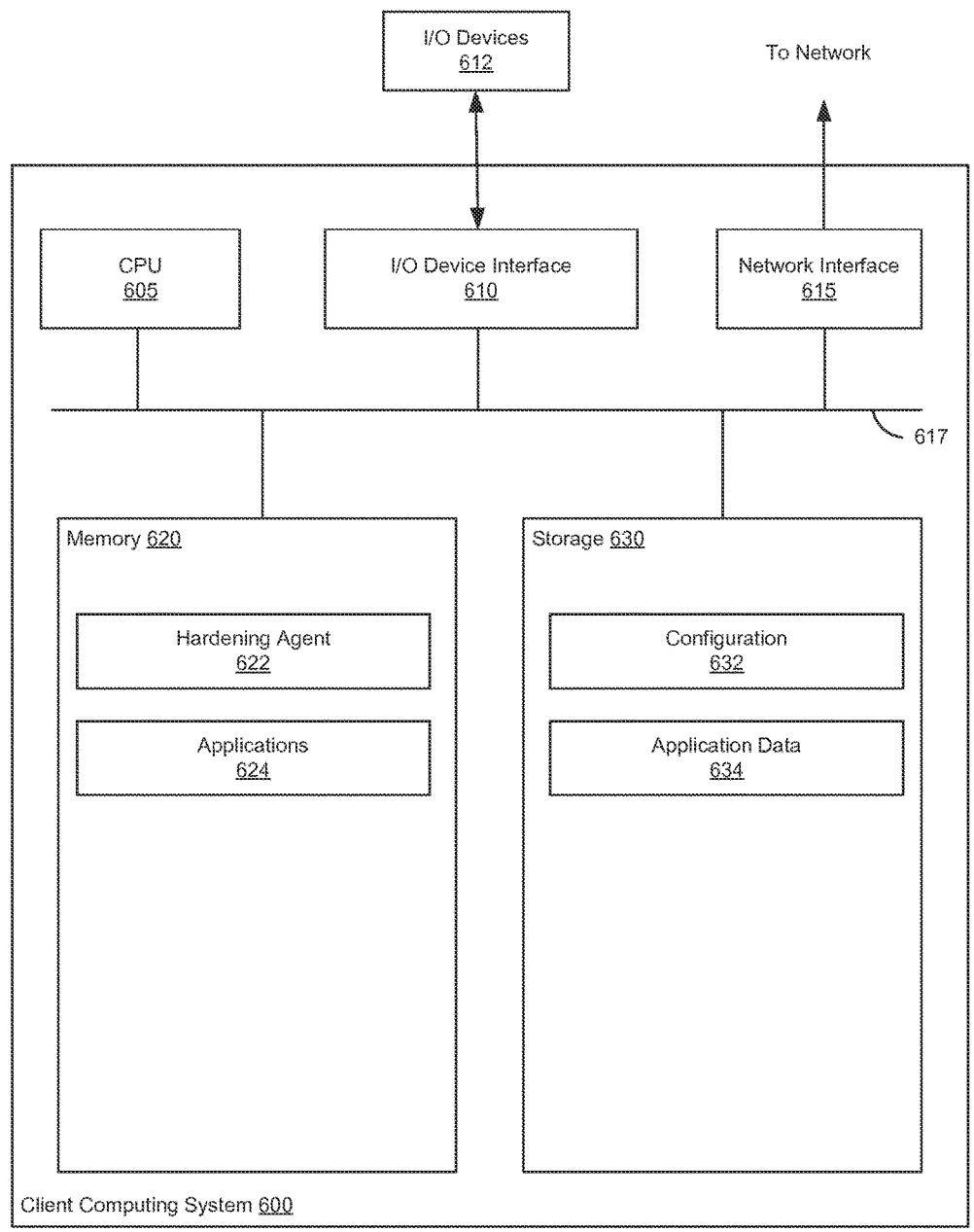
FIG. 6 illustrates an example client computing system configured with a hardening agent that enforces a hardening policy, according to one embodiment.

FIG. 6 illustrates an example client computing system 600 configured with a hardening agent that enforces a hardening policy, according to one embodiment. As shown, computing system 600 includes, without limitation, a central processing unit (CPU) 605, a network interface 615, a memory 620, and storage 630, each connected to a bus 617. The client computing system 600 may also include an I/O device interface 610 connecting I/O devices 612 (e.g., keyboard, display, mouse devices, etc.) to the client computing system 600. Further, in context of the present disclosure, the computing elements shown in the computing system 600 may correspond to a physical computing system (e.g., a system in an enterprise network).

CPU 605 retrieves and executes programming instructions stored in memory 620 as well as stores and retrieves application data residing in the storage 630. The bus 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes a hardening agent 622 and one or more applications 624. And storage 630 includes a configuration 632 and application data 634. The hardening agent 622 configures the client computing system 600 as well as the applications 624 executing on the system 600 on behalf of a hardening management server networked to the client computing system 600. The hardening agent 622 also monitors activity of the client computing system 600, such as activity reflected in application data 634, the network interface 615, and the like. The hardening agent 622 transmits activity data to the hardening management server, which, in turn, evaluates the activity data based on risk and stability metrics. The hardening agent 622 may receive a notification from the hardening management server indicating a change in policy. In response, the hardening agent 622 may reconfigure the client computer system 600, e.g., by restricting access to applications 624 specified in a whitelist (e.g., configuration 632).

Figure 7:
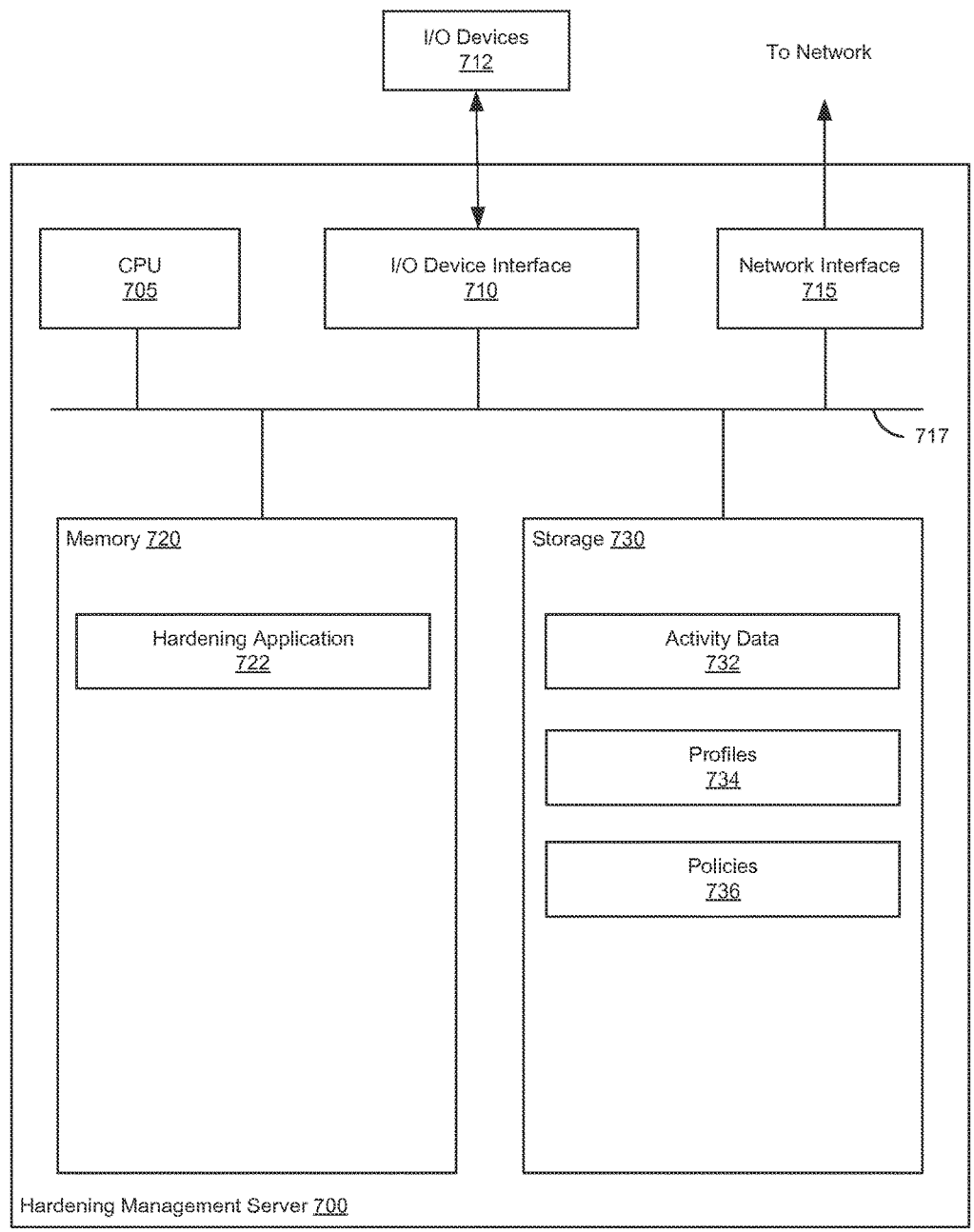
FIG. 7 illustrates an example hardening management server configured to dynamically adjust a computing system based on observed metrics, according to one embodiment.

FIG. 7 illustrates an example hardening management server 700 configured to dynamically adjust a computing system based on observed metrics, according to one embodiment. As shown, hardening management server 700 includes, without limitation, a central processing unit (CPU) 705, a network interface 715, a memory 720, and storage 730, each connected to a bus 717. The hardening management server 700 may also include an I/O device interface 710 connecting I/O devices 712 (e.g., keyboard, display, mouse devices, etc.) to the hardening management server 700. Further, in context of the present disclosure, the computing elements shown in the hardening management server 700 may correspond to a physical computing system (e.g., a system in an enterprise network).

CPU 705 retrieves and executes programming instructions stored in memory 720 as well as stores and retrieves application data residing in the storage 730. The bus 717 is used to transmit programming instructions and application data between CPU 705, I/O devices interface 710, storage 730, network interface 715, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN).

Illustratively, memory 720 includes a hardening application 722. And storage 730 includes activity data 732, profiles 734, and policies 736. The hardening application 722 monitors the activity data 732 of one or more computing systems (e.g., of an enterprise network). The hardening application 722 evaluates the activity data of a given computing system against specified profiles 734 and policies 736 assigned to the computing system. Based on the evaluation, the hardening application 722 may calculate or update hardening metrics associated with the computing system. The hardening application 722 adjusts a hardening policy based on changes in the metrics. The hardening application 722 may transmit changes in the hardening policy to the computing system, which, in turn, enforces the changes.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The preceding discussion presents a variety of embodiments. However, the present disclosure is not limited to the specifically described embodiments. Instead, any combination of the following features and elements, whether related to different embodiments or not, is contemplated to implement and practice the techniques described herein. Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
   monitoring activity on a client computer by an agent executing on the client computer, wherein the client computer is associated with a first hardening policy;
   evaluating the monitored activity based on one or more metrics, wherein each of the metrics is within a tolerance specified in the first hardening policy, and wherein the one or more metrics include a stability metric indicating a level of stability of the client computer, the stability metric being associated with the monitored activity which indicates a rate at which one or more applications are installed on the client computer;
   determining that at least one of the metrics is outside of the tolerance specified in the first hardening policy;
   associating the client computer with a second hardening policy based on the determination; and
   reconfiguring the client computer based on the second hardening policy, wherein reconfiguring the client computer based on the second hardening policy comprises:
   allowing installation of applications that are not included in a whitelist associated with the second hardening policy.

2. The method of claim 1, wherein the monitored activity is further evaluated based on a context associated with the client computer.

3. The method of claim 1, wherein the one or more metrics further include a risk metric indicating a likelihood that the client computer is susceptible to an attack.

4. The method of claim 1, wherein the monitored activity includes at least one of activity of a user logged into the client computer, activity of one or more applications executing on the client computer, activity of network resources of the client computer, and system activity of the client computer.

5. The method of claim 1, wherein reconfiguring the client computer based on the second hardening policy comprises:
   restricting access to network resources that are not included in a whitelist associated with the second hardening policy.

6. The method of claim 1, wherein reconfiguring the client computer based on the second hardening policy comprises:
   restricting access to applications that are not included in a whitelist associated with the second hardening policy.

7. A non-transitory computer-readable storage medium storing instructions, which, when executed on a processor, perform an operation, the operation comprising:
   monitoring activity on a client computer by an agent executing on the client computer, wherein the client computer is associated with a first hardening policy;
   evaluating the monitored activity based on one or more metrics, wherein each of the metrics is within a tolerance specified in the first hardening policy, and wherein the one or more metrics include a stability metric indicating a level of stability of the client computer, the stability metric being associated with the monitored activity which indicates a rate at which one or more applications are installed on the client computer;
   determining that at least one of the metrics is outside of the tolerance specified in the first hardening policy;
   associating the client computer with a second hardening policy based on the determination; and
   reconfiguring the client computer based on the second hardening policy, wherein reconfiguring the client computer based on the second hardening policy comprises:
   allowing installation of applications that are not included in a whitelist associated with the second hardening policy.

8. The computer-readable storage medium of claim 7, wherein the monitored activity is further evaluated based on a context associated with the client computer.

9. The computer-readable storage medium of claim 7, wherein the one or more metrics further include a risk metric indicating a likelihood that the client computer is susceptible to an attack.

10. The computer-readable storage medium of claim 7, wherein the monitored activity includes at least one of activity of a user logged into the client computer, activity of one or more applications executing on the client computer, activity of network resources of the client computer, and system activity of the client computer.

11. The computer-readable storage medium of claim 7, wherein reconfiguring the client computer based on the second hardening policy comprises:
    restricting access to network resources that are not included in a whitelist associated with the second hardening policy.

12. The computer-readable storage medium of claim 7, wherein reconfiguring the client computer based on the second hardening policy comprises:
    restricting access to applications that are not included in a whitelist associated with the second hardening policy.

13. A client computer comprising:
    a processor; and
    a memory storing program code, which, when executed on the processor, performs an operation, the operation comprising:
    monitoring activity on the client computer by an agent executing on the client computer, wherein the client computer is associated with a first hardening policy,
    evaluating the monitored activity based on one or more metrics, wherein each of the metrics is within a tolerance specified in the first hardening policy, and wherein the one or more metrics include a stability metric indicating a level of stability of the client computer, the stability metric being associated with the monitored activity which indicates a rate at which one or more applications are installed on the client computer,
    determining that at least one of the metrics is outside of the tolerance specified in the first hardening policy,
    associating the client computer with a second hardening policy based on the determination, and
    reconfiguring the client computer based on the second hardening policy, wherein reconfiguring the client computer based on the second hardening policy comprises:
    allowing installation of applications that are not included in a whitelist associated with the second hardening policy.

14. The client computer of claim 13, wherein the monitored activity is further evaluated based on a context associated with the client computer.

15. The client computer of claim 13, wherein the one or more metrics further include a risk metric indicating a likelihood that the client computer is susceptible to an attack.

16. The client computer of claim 13, wherein the monitored activity includes at least one of activity of a user logged into the client computer, activity of one or more applications executing on the client computer, activity of network resources of the client computer, and system activity of the client computer.

17. The system client computer of claim 13, wherein reconfiguring the client computer based on the second hardening policy comprises:
    restricting access to applications that are not included in a whitelist associated with the second hardening policy.

\* \* \* \* \*